US010168715B2

(12) United States Patent
Tsuji et al.

(10) Patent No.: US 10,168,715 B2
(45) Date of Patent: Jan. 1, 2019

(54) BALL-BALANCING ROBOT

(71) Applicant: Murata Manufacturing Co., Ltd., Nagaokakyo-shi, Kyoto-fu (JP)

(72) Inventors: Shigeru Tsuji, Nagaokakyo (JP); Mitsuru Kitagawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/687,588

(22) Filed: Aug. 28, 2017

(65) Prior Publication Data

US 2017/0357272 A1    Dec. 14, 2017

Related U.S. Application Data

(63) Continuation of application No. PCT/JP2016/056069, filed on Feb. 29, 2016.

(30) Foreign Application Priority Data

Mar. 12, 2015    (JP) .................. 2015-049356

(51) Int. Cl.
  *B60B 19/14*   (2006.01)
  *G05D 1/08*    (2006.01)
  (Continued)

(52) U.S. Cl.
  CPC .......... *G05D 1/0891* (2013.01); *A63H 11/00* (2013.01); *A63H 33/005* (2013.01); *G01C 9/02* (2013.01);
  (Continued)

(58) Field of Classification Search
  None
  See application file for complete search history.

(56) References Cited

U.S. PATENT DOCUMENTS 6,289,263 B1 *  9/2001  Mukherjee ........... A63H 33/005
                                                    700/245
2007/0215394 A1 *  9/2007  Sun ..................... B62D 57/00
                                                    180/8.1
(Continued)

FOREIGN PATENT DOCUMENTS

JP        04-201793 A    7/1992
JP     2004-129435 A    4/2004
(Continued)

OTHER PUBLICATIONS

Official Communication issued in International Patent Application No. PCT/JP2016/056069, dated Apr. 12, 2016.
(Continued)

*Primary Examiner* — Bentsu Ro
(74) *Attorney, Agent, or Firm* — Keating & Bennett, LLP

(57) ABSTRACT

A ball-balancing robot is capable of accurately controlling its posture when a robot main body is rotated about the vertical axis in a yaw direction in a state in which the robot main body is positioned on a spherical object in a posture in which a gravity center of the robot main body matches a vertical axis passing a center of the spherical object, and in a state in which a base axis of the roll-direction angular velocity sensor is inclined with respect to the horizon in a pitch direction (at an inclination angle $\theta_p$), the robot main body is able to rotate while maintaining a predetermined posture by making correction to cancel a detection error in the angular velocity in the roll direction generated based on the inclination of the base axis of the roll-direction angular velocity sensor.

14 Claims, 4 Drawing Sheets

(51) Int. Cl.
*A63H 11/00* (2006.01)
*G01C 9/02* (2006.01)
*G01P 3/00* (2006.01)
*G01P 21/00* (2006.01)
*H02K 7/00* (2006.01)
*A63H 33/00* (2006.01)

(52) U.S. Cl.
CPC .............. *G01P 3/00* (2013.01); *G01P 21/00* (2013.01); *H02K 7/003* (2013.01)

(56) References Cited

U.S. PATENT DOCUMENTS

| | | |
|---|---|---|
| 2008/0084175 A1 | 4/2008 | Hollis |
| 2008/0097644 A1* | 4/2008 | Kaznov ................. A63H 11/00 700/245 |
| 2018/0043952 A1* | 2/2018 | Ellerman ................ B60K 1/00 |

FOREIGN PATENT DOCUMENTS

| | | |
|---|---|---|
| JP | 2005-342818 A | 12/2005 |
| JP | 2006-282160 A | 10/2006 |

OTHER PUBLICATIONS

Kumaga et al., "Development of a Robot Balanced on a Ball—Application of passive motion to transport—", 2009 IEEE International Conference on Robotics and Automation, May 12-17, 2009, pp. 4106-4111.

* cited by examiner

BALL-BALANCING ROBOT

CROSS REFERENCE TO RELATED APPLICATIONS

This application claims the benefit of priority to Japanese Patent Application No. 2015-049356 filed on Mar. 12, 2015 and is a Continuation Application of PCT Application No. PCT/JP2016/056069 filed on Feb. 29, 2016. The entire contents of each application are hereby incorporated herein by reference.

BACKGROUND OF THE INVENTION

1. Field of the Invention

The present invention relates to a ball-balancing robot, and in particular to a ball-balancing robot capable of maintaining a predetermined posture while balancing when rotating about a vertical axis.

2. Description of the Related Art

Examples of a ball-balancing robot include a robot that is configured to be able to maintain a predetermined posture while balancing on a single spherical object, and this type of a robot is configured to be able to move by rolling the spherical object and to rotate about a vertical axis that passes a center of the spherical object.

Further, as one example of such a ball-balancing robot, Japanese Patent Application Laid-Open No. 2005-342818 discloses a ball-balancing robot 101 as illustrated in FIG. 5.

The ball-balancing robot 101 disclosed in Japanese Patent Application Laid-Open No. 2005-342818 includes a spherical object 110, and a robot main body 120 provided on the spherical object 110.

The robot main body 120 includes a plurality of drive mechanisms 121 for rolling the spherical object 110, and a posture-controlling actuator 124 for controlling a posture of the robot main body 120. Further, a posture-detection sensor 126 to detect the posture of the robot main body 120 is provided within the robot main body.

Moreover, the robot main body 120 on the spherical object 110 is configured to be able to move to a desired position along with the spherical object 110 by rolling the spherical object 110 by driving the plurality of drive mechanisms 121.

The ball-balancing robot 101 is also configured to allow posture control by moving a weight arranged in an upper part of the robot main body 120 in a horizontal direction to change a gravity center using the posture-controlling actuator 124, and by inclining the ball-balancing robot 101 to a predetermined direction.

In the meantime, in the ball-balancing robot, the robot main body is basically configured such that its gravity center is positioned on a vertical axis that passes the center of the spherical object. As the robot main body is placed on the spherical object, the robot main body may move along with the spherical object and rotate on the spherical object without falling or dropping.

On the other hand, as the robot main body is provided with ornamental elements, a posture-detection sensor, a battery, a control device, and the like, it is difficult to position the gravity center of the robot main body on its axial line in designing the robot.

Therefore, when the robot main body is placed on the spherical object such that its gravity center is positioned on the vertical axis, it is inevitable as it stands that a position and an orientation of the posture-detection sensor provided for the robot main body are somewhat displaced from a designed position and a designed orientation (e.g., a position and an orientation that are rotationally symmetric taking an axial line of the robot main body as a rotational axis).

Further, there is a problem that it is difficult to accurately control the posture of the robot main body, because when the robot main body is rotated about the vertical axis at which the gravity center of the robot main body is positioned and that passes the center of the spherical object (rotate in a yaw direction) in a state in which the position and the orientation of the posture-detection sensor are displaced from an intended position and an intended orientation, the posture-detection sensor detects a component in a different direction generated due to rotation in a yaw direction (e.g., a component in a roll direction) and fails to detect an accurate posture.

SUMMARY OF THE INVENTION

Preferred embodiments of the present invention provide ball-balancing robots capable of accurately controlling posture, when a robot main body placed on a spherical object is rotated about a vertical axis on which a gravity center of the robot main body is positioned (rotated in a yaw direction).

A ball-balancing robot according to a preferred embodiment of the present invention includes a spherical object; and a robot main body capable of rolling the spherical object in a state in which the robot main body is placed on the spherical object, and to move along with the spherical object, wherein the robot main body includes: a driver that rotates the robot main body on the spherical object in a yaw direction; a yaw-direction angular velocity sensor that detects an angular velocity of the robot main body in the yaw direction; and a roll-direction angular velocity sensor that detects an angular velocity of the robot main body in a roll direction.

The robot main body is structured such that, when the robot main body is rotated about the vertical axis in the yaw direction in a state in which the robot main body is located on the spherical object in a posture in which a gravity center of the robot main body matches a vertical axis passing a center of the spherical object, and in a state in which a base axis of the roll-direction angular velocity sensor is inclined with respect to the horizon in a pitch direction, the robot main body is able to be rotated about the vertical axis in the yaw direction while maintaining a predetermined posture by making correction to cancel a detection error in the angular velocity in the roll direction generated based on the inclination of the base axis of the roll-direction angular velocity sensor.

Further, a ball-balancing robot according to a preferred embodiment of the present invention is preferably structured such that the robot main body includes a pitch-direction angular velocity sensor that detects an angular velocity in the pitch direction, and the robot main body obtains an angle of the inclination of the base axis of the roll-direction angular velocity sensor with respect to the horizon based on the angular velocity detected by the pitch-direction angular velocity sensor, and obtains an error in the angular velocity in the roll direction based on the obtained angle.

Because the robot main body includes the pitch-direction angular velocity sensor that detects an angular velocity in the pitch direction, the robot main body obtains an angle of the inclination of the base axis of the roll-direction angular velocity sensor with respect to the horizon based on the angular velocity detected by the pitch-direction angular velocity sensor, and obtains an error in the angular velocity in the roll direction based on the obtained angle, it is possible to provide a ball-balancing robot capable of rotating the robot main body more stably in the yaw direction.

A ball-balancing robot according to a preferred embodiment of the present invention has a structure that, when the robot main body is rotated about the vertical axis in the yaw direction in a state in which the robot main body is positioned on the spherical object in a posture in which a gravity center of the robot main body matches a vertical axis passing a center of the spherical object, and in a state in which a base axis of the roll-direction angular velocity sensor is inclined with respect to the horizon in a pitch direction, is able to rotate while maintaining a predetermined posture by making correction to cancel a detection error in the angular velocity in the roll direction generated based on the inclination of the base axis of the roll-direction angular velocity sensor. Therefore, it is possible to provide a ball-balancing robot capable of, when the robot main body is rotated about the vertical axis (rotated in the yaw direction), accurately controlling the posture and rotating the robot main body stably in a predetermined posture.

It should be noted that, according to a preferred embodiment of the present invention, when the ball-balancing robot faces front, a direction in which the ball-balancing robot sways back and forth is referred to as a pitch direction, and a direction in which the ball-balancing robot sways right and left is referred to as a roll direction. However, a front of the ball-balancing robot may be determined optionally depending on a design of the robot and how the robot is oriented. In other words, according to the present invention, which side of the ball-balancing robot should be front is a matter that may be determined optionally, and the same advantageous effects are achieved even if the roll direction is switched to the pitch direction and vice versa.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be described in further detail with reference to preferred embodiments of the present invention.

Figure 1:
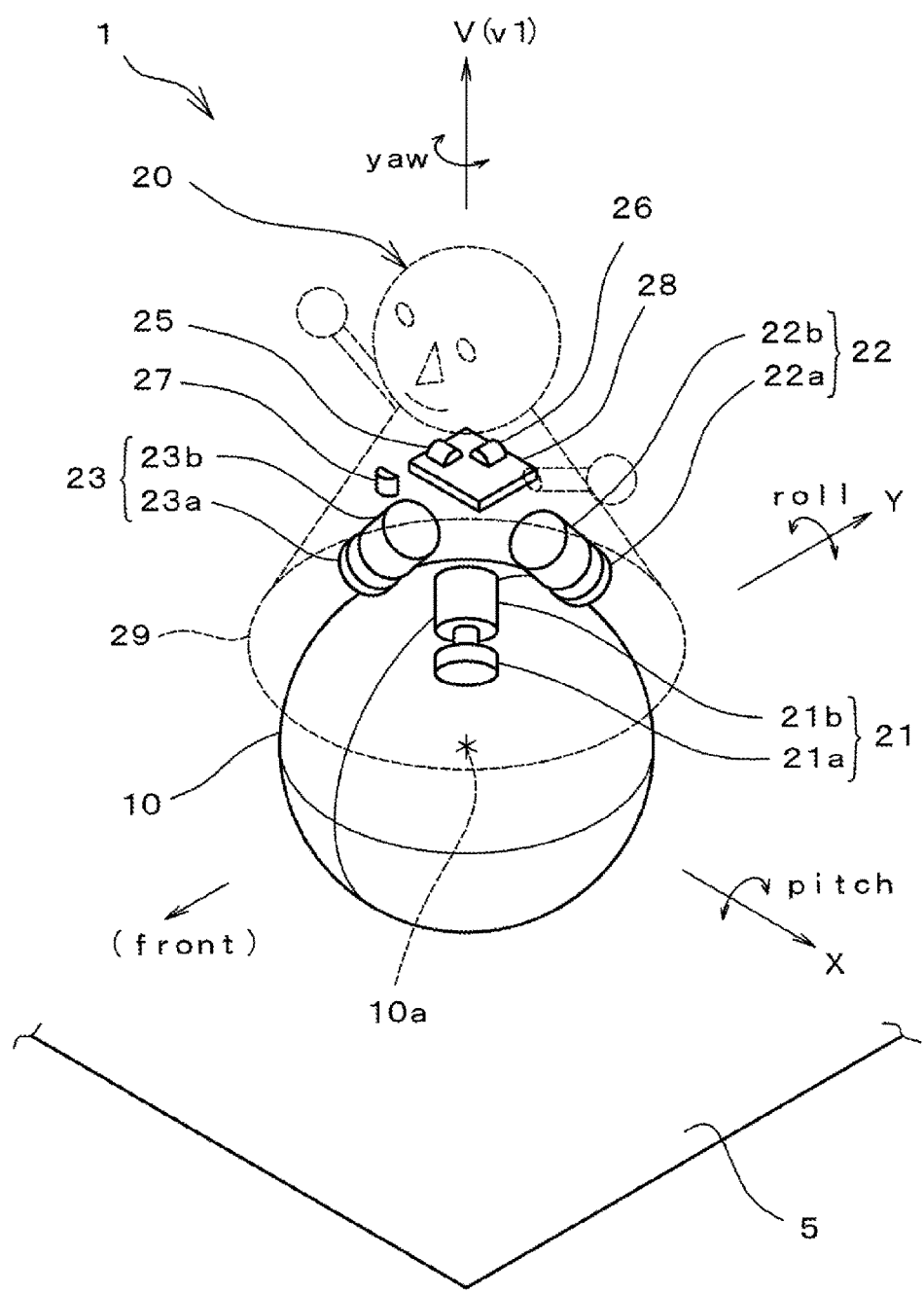
FIG. 1 is a perspective view schematically illustrating a ball-balancing robot according to a preferred embodiment of the present invention.

As illustrated in FIG. 1, a ball-balancing robot 1 according to a preferred embodiment of the present invention includes a single spherical object 10, and a robot main body 20 capable of rolling the spherical object 10 in a state in which the robot main body 20 is placed on the spherical object 10, and capable of moving along with the spherical object 10.

The ball-balancing robot 1 is remotely controlled by a control device (not shown) such as a computer, and is able to move across a surface 5 by rolling the spherical object 10, and able to rotate in a yaw direction about a vertical axis v1 that passes a center of the spherical object 10.

It should be noted that, in this preferred embodiment, a case is mainly described in which the ball-balancing robot 1 is rotated about the vertical axis v1 in the yaw direction at the same position on the stage 5, for example.

The spherical object 10 of the ball-balancing robot 1 preferably is a spherical rigid body made of a resin material, for example. The spherical object 10 may be made of a metallic material, or may be made by coating the metallic material with the resin material. However, it is desirable that a surface of the spherical object 10 has an adequate level of frictional resistance so that the robot main body 20 may not slip off and a driving force from omni wheels 21a to 23a to be described below may be fully transmitted.

The robot main body 20 includes three drivers or drive mechanisms 21, 22, and 23 to rotate the spherical object 10 in the yaw direction.

Further, the robot main body 20 includes a pitch-direction angular velocity sensor 25 that detects an angular velocity in a pitch direction, a roll-direction angular velocity sensor 26 to detect an angular velocity in a roll direction, and a yaw-direction angular velocity sensor 27 to detect an angular velocity in the yaw direction.

Figure 4:
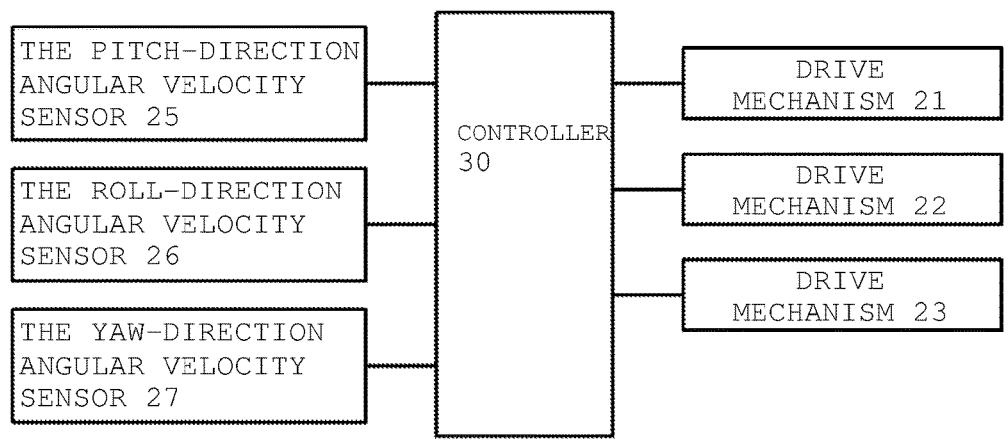
FIG. 4 is a control input/output diagram of the ball-balancing robot according to a preferred embodiment of the present invention.
Figure 5:
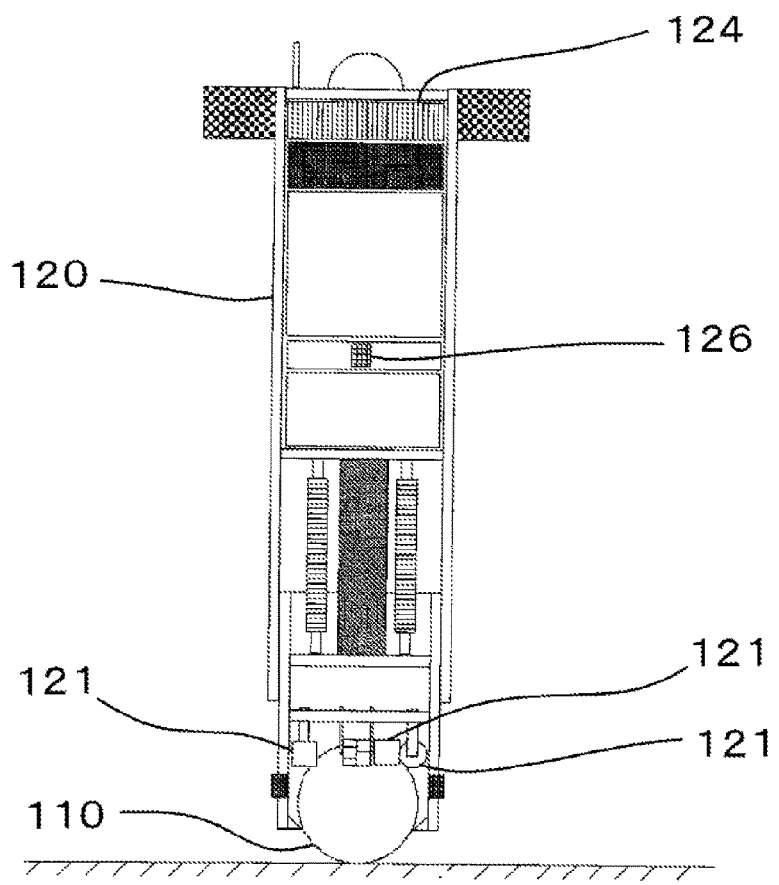
FIG. 5 is a view illustrating a conventional ball-balancing robot.

The robot main body 20 includes a built-in controller 30 (see FIG. 4) that performs arithmetic processing to input signals from the angular velocity sensors 25 to 27 to output driving commands to the drivers or drive mechanisms 21 to 23, respectively.

The drivers or drive mechanisms 21 to 23 include the omni wheels 21a, 22a, and 23a, respectively, that allow the robot main body 20 to move in all directions, and the gear-attached servomotors 21b, 22b, and 23b that rotate the omni wheels 21a to 23a, respectively. The drivers or drive mechanisms 21 to 23 are positioned on the spherical object 10 such that their shaft centers are directed in three directions with respect to a vertical direction V, and outer peripheral surfaces of the omni wheels 21a to 23a are brought into contact with a surface of the spherical object 10.

The robot main body 20 is structured such that driving of the drivers or drive mechanisms 21 to 23 allows the robot main body 20 to move in any direction along with the spherical object 10 and to rotate the robot main body 20 on the spherical object 10 in the yaw direction. It should be noted that when the robot main body 20 rotates, the spherical object 10 may stand still or slightly rotate in an opposite direction.

Further, the ball-balancing robot 1 of this preferred embodiment is structured such that its position on the surface 5 in a horizontal direction may be controlled by a controller(s) that is not shown in FIG. 1.

Moreover, the robot main body 20 may preferably include a circuit board 28 including circuitry thereon that defines and functions as the controller 30, for example. The pitch-direction angular velocity sensor 25 and the roll-direction angular velocity sensor 26 described above are preferably mounted on the circuit board 28. In addition, the yaw-direction angular velocity sensor 27 is disposed within a cover 29 of the robot main body 20 such that its base axis becomes parallel or substantially parallel to the vertical direction V.

Figure 2:
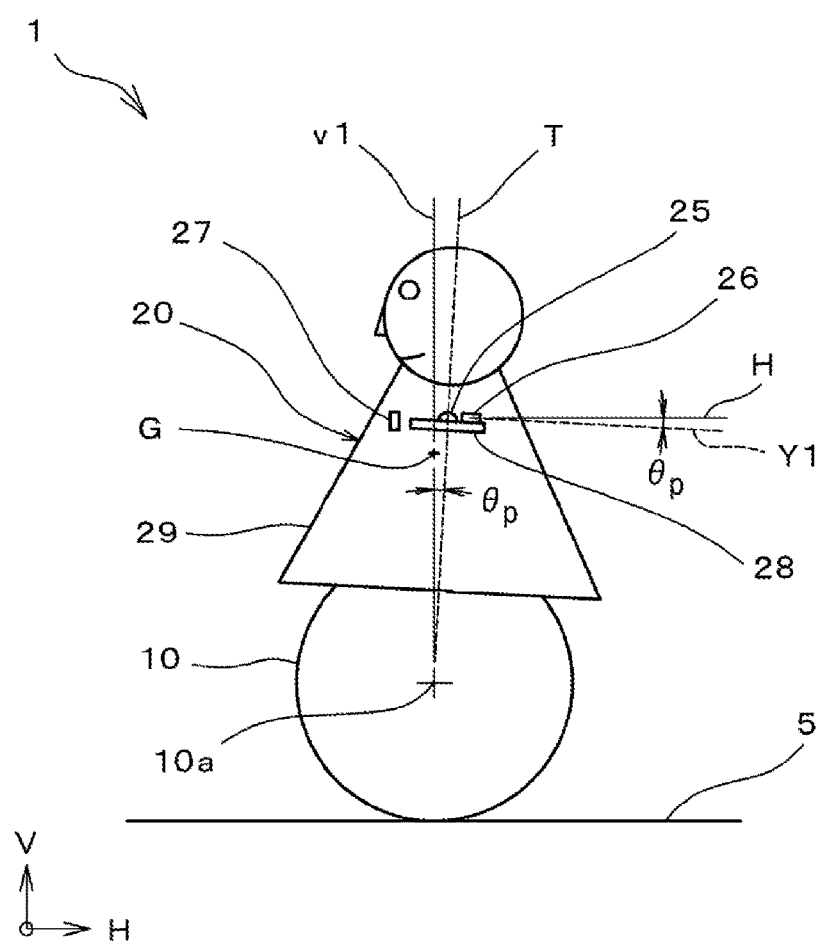
FIG. 2 is a side view of the ball-balancing robot according to a preferred embodiment of the present invention, illustrating a state in which a gravity center of a robot main body matches a vertical axis that passes a center of a spherical object.

As described above, the ball-balancing robot 1 of this preferred embodiment includes the drivers or drive mechanisms 21 to 23, the pitch-direction angular velocity sensor 25, the roll-direction angular velocity sensor 26, the yaw-direction angular velocity sensor 27, and the like. When the robot main body 20 is placed on the spherical object 10 in a state in which a gravity center G of the robot main body 20 is on the vertical axis v1 passing a center of the spherical object 10, an axial line T of the robot main body 20 and the vertical axis v1 do not match as illustrated in FIG. 2, forming a predetermined angle ($\theta_p$ in this preferred embodiment) between the axial line T and the vertical axis v1. Thus, a main surface of the circuit board 28 is inclined with respect to a horizon in the pitch direction at the predetermined angle ($\theta_p$ in this preferred embodiment=).

As a result, a base axis Y1 of the roll-direction angular velocity sensor 26 is also inclined with respect to a horizon in the pitch direction at the predetermined angle ($\theta_p$ in this preferred embodiment).

Therefore, for example, when the robot main body 20 is rotated in the yaw direction about the vertical axis v1 passing the center of the spherical object 10 on which the gravity center G of the robot main body 20 is placed, the angular velocity in the roll direction detected by the roll-direction angular velocity sensor 26 should include an error generated based on the inclination of the base axis Y1 of the roll-direction angular velocity sensor 26. In other words, a component in the roll direction generated due to the rotation in the yaw direction is detected, which component results in an error contained in a detected value of the angular velocity in the roll direction.

Therefore, the ball-balancing robot 1 according to this preferred embodiment is structured to, when the robot main body 20 is rotated about the vertical axis v1 in the above described state, perform correction to cancel the detection error in the angular velocity in the roll direction that is generated based on the inclination of the base axis Y1 of the roll-direction angular velocity sensor 26.

Specifically, when the inclination angle of the base axis Y1 of the roll-direction angular velocity sensor 26 with respect to the horizon is $\theta_p$, an angular velocity in the roll direction after performing the correction is calculated based on an expression (1) listed below.

$$\omega_{r1} = (\omega_r - \omega_y \cdot \sin \theta_p) \quad \text{(Expression 1)}$$

$\omega_{r1}$: an angular velocity in the roll direction after the correction $\omega_r$: an angular velocity in the roll direction before the correction (the angular velocity detected by the roll-direction angular velocity sensor)

$\omega_y$: an angular velocity in the yaw direction $\theta_p$: an inclination angle in the pitch direction (the inclination angle of the base axis of the roll-direction angular velocity sensor with respect to the horizon)

Figure 3:
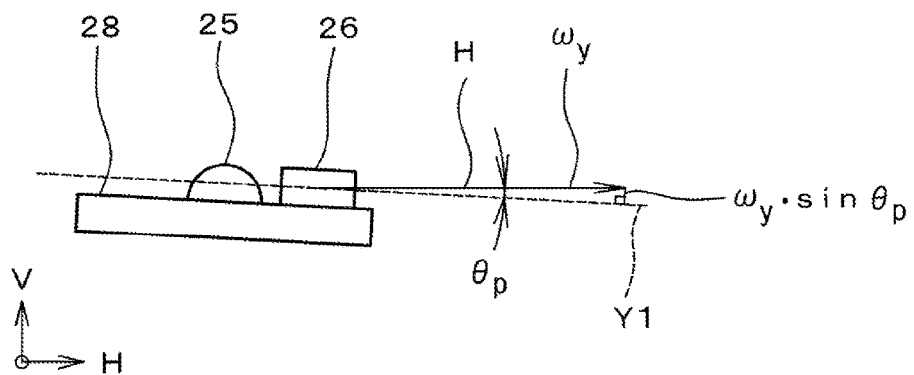
FIG. 3 is a diagram illustrating an angular velocity generated in a yaw direction when the robot main body illustrated in FIG. 2 is rotated in the yaw direction, and an angular velocity generated in a roll direction as an error component.

In other words, when the robot main body 20 is rotated in the yaw direction, the ball-balancing robot 1 obtains the angular velocity ($\omega_y \cdot \sin \theta_p$) generated in the roll direction as an error component according to the angular velocity $\omega_y$ generated in the yaw direction (see FIG. 3), and obtains the angular velocity $\omega_{r1}$ in the roll direction after the correction by subtracting the angular velocity ($\omega_y \cdot \sin \theta_p$) as the error component from the angular velocity (before the correction) $\omega_r$ detected by the roll-direction angular velocity sensor 26.

It should be noted that the angular velocity $\omega_y$ generated in the yaw direction may be detected by the yaw-direction angular velocity sensor 27.

Further, the ball-balancing robot 1 according to this preferred embodiment controls the inclination in the roll direction, when the robot main body 20 on the spherical object 10 is rotated in the yaw direction, using the angular velocity $\omega_{r1}$ in the roll direction after the correction, so that the robot main body 20 is able to rotate stably in the yaw direction.

Specifically, the ball-balancing robot 1 according to this preferred embodiment is structured such that the robot main body 20 is able to rotate stably in the yaw direction, by calculating an inclination $\theta_r$ (not shown) of the robot main body 20 in the roll direction by integration of the angular velocity $\omega_{r1}$ in the roll direction after the correction by time t based on an expression (2) listed below, and by controlling the inclination $\theta_r$ in the roll direction to be approximated to a target value (e.g., the inclination is 0).

$$\theta_r = \int_0^t \omega_{r1} dt \quad \text{(Expression 2)}$$

$\theta_r$: Inclination in roll direction

It should be noted that, as illustrated in FIG. 2, as the inclination angle $\theta_p$ in the pitch direction in the expression (1) of the present preferred embodiment, it is possible to use an angle $\theta_p$ (static value) between the axial line T of the robot main body 20 and the vertical axis v1 in the state in which the robot main body 20 is placed on the spherical object 10 so that the gravity center G of the robot main body 20 comes on the vertical axis v1, or it is possible to use an actual inclination angle $\theta_p$ (variable value) calculated based on the angular velocity detected by the pitch-direction angular velocity sensor 25.

Further, in the above preferred embodiment, the case is described in which the ball-balancing robot 1 is rotated about the vertical axis v1 in the yaw direction at the same position on the stage 5, for example. However, the present invention may also be applied to a case in which the ball-balancing robot 1 is rotated in the yaw direction while being moved in a horizontal direction at constant velocity.

The present invention is not limited to the above-described preferred embodiments in other points, and may be variously modified and altered within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ball-balancing robot comprising:
   a spherical object; and
   a robot main body capable of rolling the spherical object in a state in which the robot main body is placed on the spherical object, and moving along with the spherical object; wherein
   the robot main body includes:
   a driver that rotates the robot main body on the spherical object in a yaw direction;
   a yaw-direction angular velocity sensor that detects an angular velocity of the robot main body in the yaw direction; and a roll-direction angular velocity sensor that detects an angular velocity of the robot main body in a roll direction; and when the robot main body is rotated about a vertical axis in the yaw direction in a state in which the robot main body is located on the spherical object in a posture in which a gravity center of the robot main body matches a vertical axis passing a center of the spherical object, and in a state in which a base axis of the roll-direction angular velocity sensor is inclined with respect to a horizon in a pitch direction, the robot main body is able to be rotated about the vertical axis in the yaw direction while maintaining a predetermined posture by making correction to cancel a detection error in the angular velocity in the roll direction generated based on the inclination of the base axis of the roll-direction angular velocity sensor.

2. The ball-balancing robot according to claim 1, wherein the robot main body includes a pitch-direction angular velocity sensor that detects an angular velocity in the pitch direction; and the robot main body obtains an angle of the inclination of the base axis of the roll-direction angular velocity sensor with respect to the horizon based on the angular velocity detected by the pitch-direction angular velocity sensor, and obtains an error in the angular velocity in the roll direction based on the obtained angle.

3. The ball-balancing robot according to claim 1, wherein the robot main body is a spherical rigid body made of at least one of a resin and a metal.

4. The ball-balancing robot according to claim 1, wherein the drive is a first driver and the ball-balancing robot includes a second driver and a third driver.

5. The ball-balancing robot according to claim 4, wherein each of the first driver, the second driver and the third driver includes a wheel and a servomotor.

6. The ball-balancing robot according to claim 1, wherein the driver includes a wheel and a servomotor.

7. The ball-balancing robot according to claim 1, further comprising a controller the controls movement of the robot main body and includes a circuit board.

8. The ball-balancing robot according to claim 7, wherein the pitch-direction angular velocity sensor and the roll-direction angular velocity sensor are mounted on the circuit board.

9. The ball-balancing robot according to claim 7, wherein the circuit board is inclined with respect to the horizon in the pitch direction.

10. The ball-balancing robot according to claim 1, wherein when an inclination angle of the base axis of the roll-direction angular velocity sensor with respect to the horizon is $\theta_p$, an angular velocity in the roll direction after the error is canceled is calculated according to $\omega_{r1}=(\omega_r-\omega_y \cdot \sin \theta_p)$, where $\omega_{r1}$ is an angular velocity in the roll direction after the error is canceled, $\omega_r$ is an angular velocity in the roll direction before the error is canceled, $\omega_y$ is an angular velocity in the yaw direction, and $\theta_p$ is an inclination angle in the pitch direction.

11. The ball-balancing robot according to claim 10, wherein an inclination of the robot main body in the roll direction when the robot main body is rotated in the yaw direction is calculated using the angular velocity $\omega_{r1}$ in the roll direction after the error is canceled.

12. The ball-balancing robot according to claim 10, wherein the angle $\theta_p$ is an angle between an axial line of the robot main body and the vertical axis when a gravity center of the robot main body is along the vertical axis.

13. The ball-balancing robot according to claim 10, wherein the robot main body includes a pitch-direction angular velocity sensor that detects an angular velocity in the pitch direction; and the angle $\theta_p$ is an actual inclination angle calculated based on the angular velocity detected by the pitch-direction angular velocity sensor.

14. The ball-balancing robot according to claim 1, wherein the robot main body is moved in a horizontal direction at a constant velocity.

* * * * *